United States Patent
Raggio

(10) Patent No.: US 11,703,620 B2
(45) Date of Patent: *Jul. 18, 2023

(54) LENS FOR PROTECTIVE GEAR

(71) Applicant: RAYOTEK SCIENTIFIC, INC., San Diego, CA (US)

(72) Inventor: William Raggio, Del Mar, CA (US)

(73) Assignee: RAYOTEK SCIENTIFIC, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/101,037

(22) Filed: Nov. 23, 2020

(65) Prior Publication Data

US 2021/0072440 A1 Mar. 11, 2021

Related U.S. Application Data

(63) Continuation of application No. 15/489,907, filed on Apr. 18, 2017, now Pat. No. 10,845,519.

(Continued)

(51) Int. Cl.
*G02B 5/20* (2006.01)
*B32B 3/04* (2006.01)
(Continued)

(52) U.S. Cl.
CPC ............. *G02B 5/208* (2013.01); *B32B 3/04* (2013.01); *B32B 17/10* (2013.01); *G02B 5/282* (2013.01); *B32B 2437/04* (2013.01)

(58) Field of Classification Search
CPC .......... G02B 5/208; G02B 5/282; B32B 3/04; B32B 17/064; B32B 2437/04
(Continued)

(56) References Cited

U.S. PATENT DOCUMENTS 2,871,371 A 1/1959 Gray
3,484,156 A 12/1969 Mititello
(Continued)

FOREIGN PATENT DOCUMENTS

CN 103864283 A 6/2014
CN 104129906 A 11/2014
(Continued)

OTHER PUBLICATIONS

Diamond "Welding Shade Number Luminous Transmittance Safety Chart" posted online at https://photo.stackexchange.com/questions/38502/how-do-welders-glass-shades-translate-to-stops-when-used-as-an-nd-filter (Year: 2015).*
(Continued)

*Primary Examiner* — George G. King
(74) *Attorney, Agent, or Firm* — Arc IP Law, PC; Joseph J. Mayo

(57) ABSTRACT

A lens for protective gear has first and second polymer layers with a glass layer therebetween. The glass layer is fused to the first and second polymer layers and encapsulated by the first and second polymer layers with the glass layer in compression. The lens may have a coating that provides the lens with (i) less than about 5 percent transmittance for light having wavelengths of less than 400 nm and greater than about 700 nm for an entire horizontal field of view of the lens, (ii) greater than 75 percent transmittance of light having wavelengths of between about 400 nm and about 700 nm for the entire horizontal field of view of the lens with less than about 5 percent transmittance of light having wavelength between about 530 nm and about 580 nm for a horizontal field of view of the lens of not greater than 60 degrees.

11 Claims, 12 Drawing Sheets

Related U.S. Application Data

(60) Provisional application No. 62/404,896, filed on Oct. 6, 2016, provisional application No. 62/328,166, filed on Apr. 27, 2016.

(51) Int. Cl.
   *B32B 17/10* (2006.01)
   *G02B 5/28* (2006.01)

(58) Field of Classification Search
   USPC .......................................................... 359/361
   See application file for complete search history.

(56) References Cited

U.S. PATENT DOCUMENTS

| | | | |
|---|---|---|---|
| 3,810,815 | A | 5/1974 | Welhart et al. |
| 4,031,190 | A | 6/1977 | Bernal et al. |
| 4,118,448 | A | 10/1978 | Anderson |
| 4,268,134 | A | 5/1981 | Gulati et al. |
| 4,405,692 | A | 9/1983 | Yamagishi |
| 4,440,591 | A | 4/1984 | Pook |
| 4,663,228 | A | 5/1987 | Bolton et al. |
| 4,983,555 | A | 1/1991 | Roy et al. |
| 5,061,333 | A * | 10/1991 | Ishikawa ........... B32B 17/10027 156/286 |
| 5,082,515 | A | 1/1992 | Cartier et al. |
| 5,191,468 | A | 3/1993 | Mases |
| 5,400,174 | A | 3/1995 | Pagis et al. |
| 5,786,287 | A | 7/1998 | Bayya et al. |
| 6,923,537 | B2 | 8/2005 | Hartley et al. |
| 7,875,565 | B1 | 1/2011 | Pinckney et al. |
| 10,845,519 | B2 * | 11/2020 | Raggio ..................... B32B 3/04 |
| 2004/0067343 | A1 | 4/2004 | Beteille et al. |
| 2004/0231778 | A1 | 11/2004 | Teschner et al. |
| 2005/0002083 | A1 * | 1/2005 | Fergason ................ A61F 9/067 359/276 |
| 2006/0093738 | A1 | 5/2006 | Lin et al. |
| 2006/0147691 | A1 | 7/2006 | Rockenfeller et al. |
| 2007/0087204 | A1 | 4/2007 | Bayya et al. |
| 2008/0100921 | A1 | 5/2008 | Nishikawa et al. |
| 2008/0210361 | A1 | 9/2008 | Bohm et al. |
| 2008/0239452 | A1 | 10/2008 | Xu et al. |
| 2009/0159858 | A1 | 6/2009 | Noguchi et al. |
| 2010/0220388 | A1 | 9/2010 | Suzuki et al. |
| 2011/0119801 | A1 | 5/2011 | Wright |
| 2012/0086909 | A1 | 4/2012 | Paulson |
| 2012/0287395 | A1 | 11/2012 | Tamura et al. |
| 2013/0065746 | A1 | 3/2013 | Bayya et al. |
| 2014/0256865 | A1 | 9/2014 | Boulton et al. |
| 2016/0195651 | A1 | 7/2016 | Yoshioka et al. |
| 2017/0052286 | A1 * | 2/2017 | Hines ................... G08G 1/0141 |

FOREIGN PATENT DOCUMENTS

| | | |
|---|---|---|
| CN | 104210185 B | 5/2016 |
| EP | 0463812 A2 | 1/1992 |
| WO | 2008114058 A1 | 9/2008 |
| WO | 2015010922 A1 | 1/2015 |
| WO | 2016025188 A1 | 2/2016 |

OTHER PUBLICATIONS

Wikipedia page "Glass Transitions" https://en.wikipedia.org/wiki/glass_transition; archived Jan. 2015.

"Choosing the Right Material", Jul. 3, 2015, https://rayotek.com/tech-specs/material -comparisons.htm; entire document.

* cited by examiner

LENS FOR PROTECTIVE GEAR

This application is a continuation of U.S. patent application Ser. No. 15/489,907, filed on Apr. 18, 2017, which claims the benefit of provisional application Ser. No. 62/328,166 filed on Apr. 27, 2016, and provisional application Ser. No. 62/404,896 filed on Oct. 6, 2016, the specifications of which are hereby incorporated herein by reference in their entirety.

BACKGROUND OF THE INVENTION

Field of the Invention

The present disclosure relates to a lens for protective gear.

BRIEF SUMMARY OF THE INVENTION

The present disclosure relates to a lens for protective gear. By way of example and without limitation, the protective gear may be a partial helmet, full helmet, a fire helmet, hood, or safety helmet. By way of example and without limitation, the lens may be incorporated into a face shield, goggles, a mask, or a visor for the protective gear. The lens may have a coating configured to block infrared and ultra-violet radiation. The coating may also block visible light having a wavelength of about 555 nm in the line of sight of the user of the protective gear and lens, and pass visible light having a wavelength of about 555 nm in the peripheral vision of the user of the protective gear and lens. It should be noted that wavelengths around 555 nm are known as the "brightness" wavelengths. It is this range of wavelengths that the human eye exceptionally sensitive to and vulnerable to light blindness. The lens may be formed from a laminate of a polymer and a glass in a manner such that the glass provides strength and rigidity for the laminate structure.

DETAILED DESCRIPTION OF THE INVENTION

Figure 1:
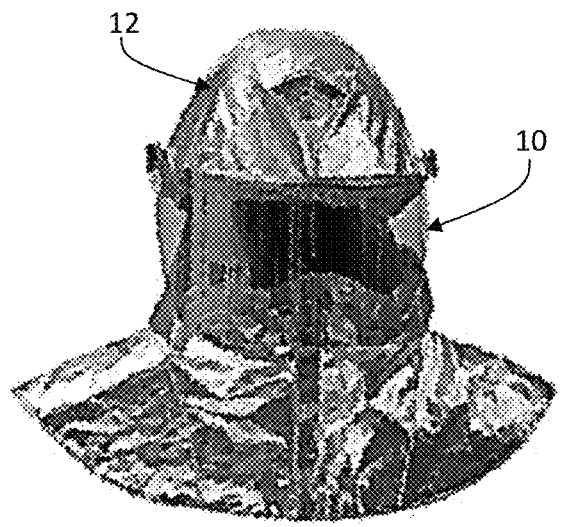
FIGS. 1 and 2 provide examples of protective gear and lens applications.
Figure 2:
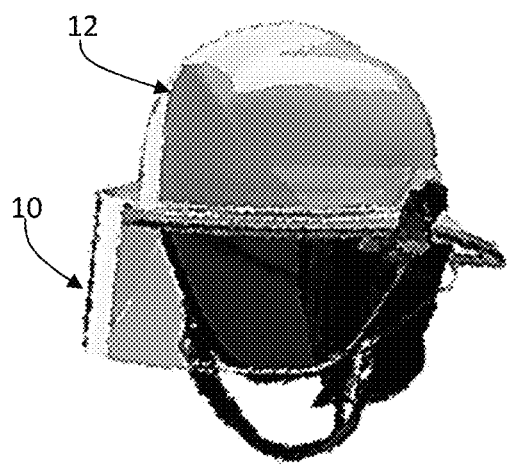

As mentioned above, the lens 10 may be incorporated into protective gear 12, such as a partial helmet, full helmet, a fire helmet, hood, or safety helmet, and the lens may take the form of a face shield, goggles, mask, or visor. Examples are shown in FIGS. 1 and 2. The lens 10 may comprise a laminate structure comprising a polymer layer 14 and a glass layer 16. The polymer layer 14 may comprise a thermoplastic. For instance, the polymer layer may comprise a material sold under the trademark TEXERON provided by Texstar, LLC of Grand Prairie, Tex. The TEXERON polymer material has been proven effective as it maintains its structural integrity for high temperatures. The polymer layer may also comprise polycarbonate. The glass layer 16 may be formed from borosilicate or an impact resistant glass that may be chemically strengthened. Fused quartz glass may be used. One type of material for the glass layer 16 that has proven effective is sold under the trademark Gorilla Glass provided by Corning, Inc. of Corning, N.Y. The material for the glass layer 16 may also have properties whereby the material maintains its structural integrity up to temperatures of at least 500.degree. C.

Figure 3:
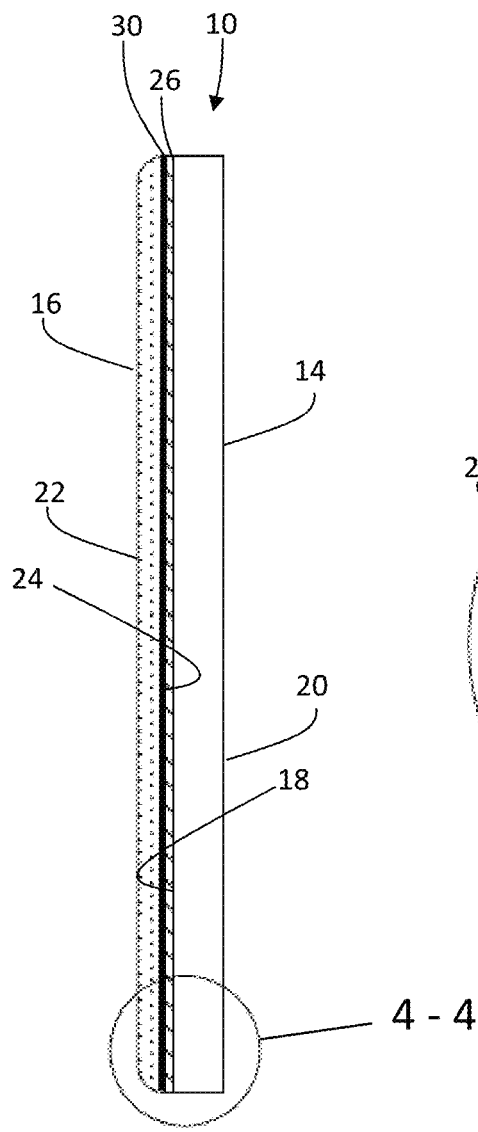
FIG. 3 shows a top, cross sectional view of one embodiment of the lens comprising a polymer layer secured to a glass layer with an adhesive.
Figure 4:
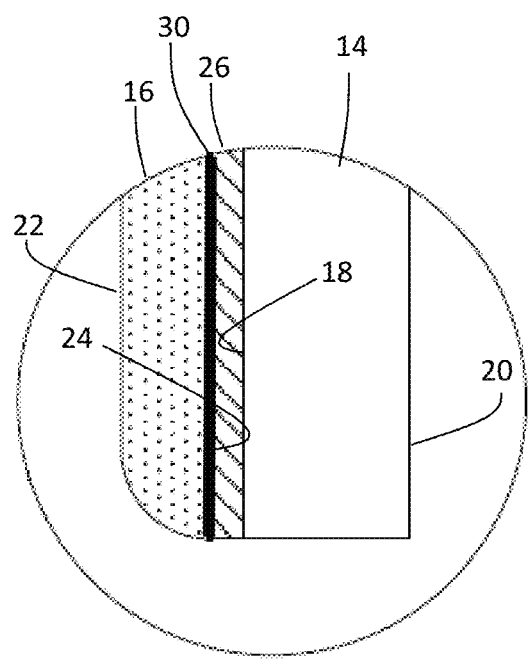
FIG. 4 shows an enlarged view of detail area 4-4 of FIG. 3.
Figure 5:
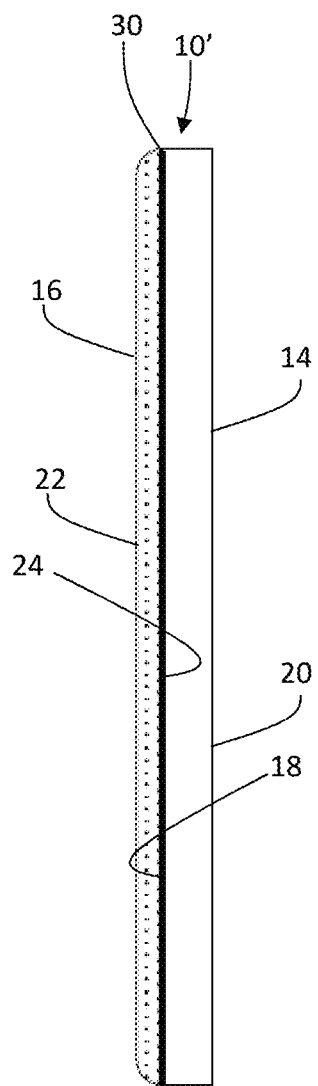
FIGS. 5 and 6 show a top, cross sectional views of other embodiments of the lens comprising a polymer layer molded directly to a glass layer.
Figure 6:
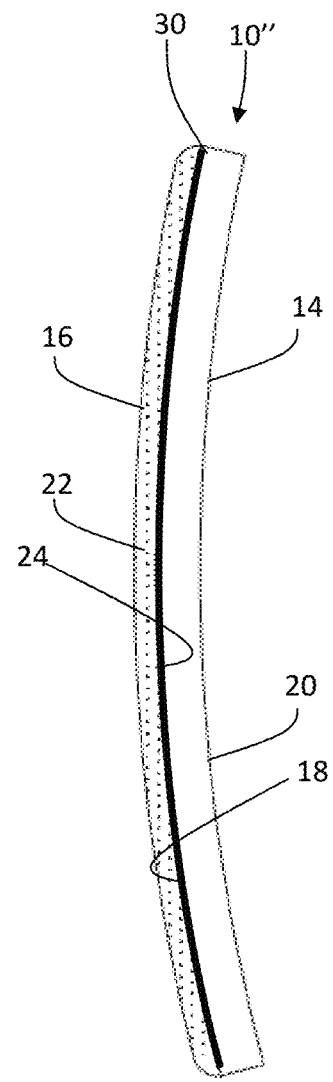

FIGS. 3-6 show cross-sectional views of different embodiments of the laminate structure of the lens 10. The laminate structure polymer layer 14 may have first and second surfaces 18, 20, and the glass layer 16 may have first and second surfaces 22, 24. The glass layer first surface 22 may be exposed from the lens 10 and may form the exterior facing surface of the lens. The glass layer second surface 24 may be adjacent the polymer layer first surface 18 with the polymer layer second surface 20 being exposed from the lens 10. The polymer layer second surface 20 may form the interior facing surface of the lens and may be positioned adjacent to the user of the protective gear. In FIG. 3, the laminate structure polymer layer 14 is bonded to the glass layer 16 with an adhesive 26. The adhesive 26 may be an index matching adhesive to avoid image distortion from surface reflection and refraction between the glass layer 16 and polymer layer 14. FIGS. 5 and 6 show embodiments of the lens laminate structure where the polymer layer 14 is molded directly onto the glass layer 16, thereby eliminating the need for an adhesive. FIG. 5 shows a flat laminate structure for the lens 10', and FIG. 6 shows a curved laminate structure for the lens 10".

Figure 7:
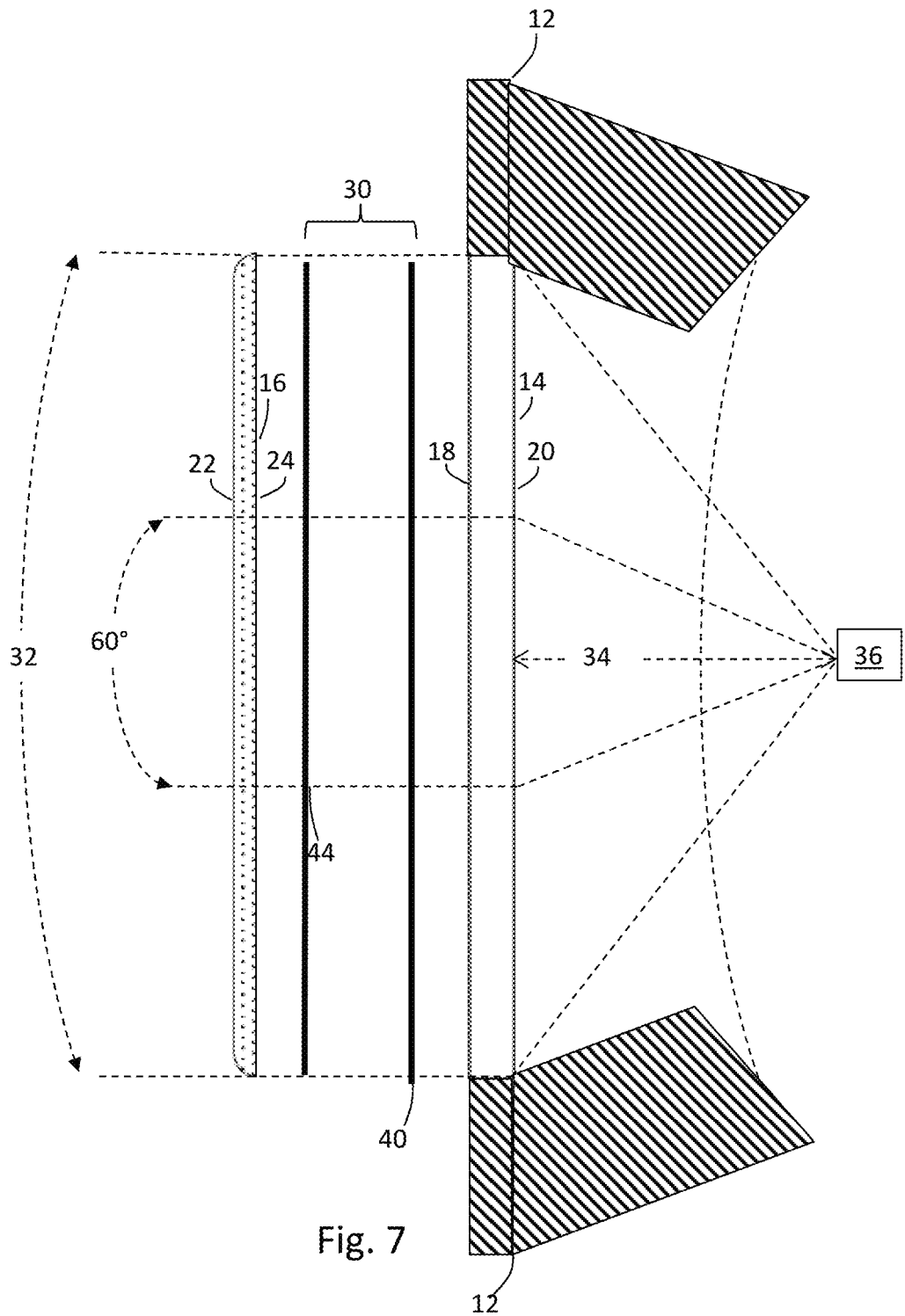
FIG. 7 is top, cross sectional, exploded view of the lens of FIG. 5 schematically depicting layers comprising a coating for the lens and the field of view of the lens.
Figure 8:
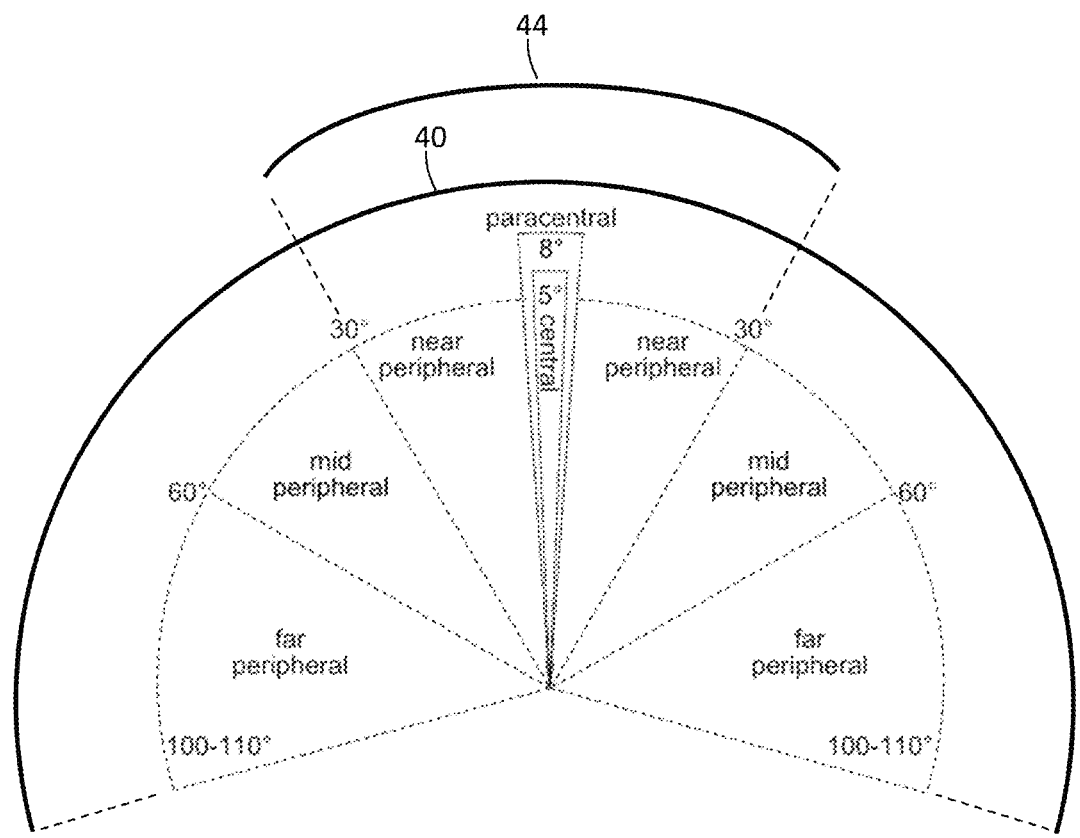
FIG. 8 is a schematic view of the coating for the lens relative to a peripheral vision of a user.

The lens 10 may have a coating 30 with particular transmittance characteristics. The coating 30 may comprise the deposition of one material or one layer of material, or the coating may comprise the deposition of more than one materials and/or multiple layers (e.g., the combination of the deposition of multiple layers and/or different materials), each of which may have different transmittance characteristics that in the combination provide the desired overall transmittance characteristics for the lens. In particular, the coating 30 may be applied in a manner such that the coating, and/or the material(s) chosen to be deposited on the lens comprising the coating, provide for any or all of the following transmittance characteristics for the lens: (i) less than about 5 percent transmittance through the lens for light having wavelengths of less than 400 nm and greater than about 700 nm for the entire horizontal field of view of the lens, (ii) greater than 75 percent transmittance through the lens for light having wavelengths of between about 400 nm and about 700 nm for the entire horizontal field of view of the lens, with less than about 5 percent transmittance through the lens for light having wavelengths between about 530 nm and about 580 nm for a horizontal field of view of the lens of not greater than 60 degrees (+/−30 degrees from straight forward gaze). The horizontal field of view 32 may be the angle spanning across the center 34 of the lens 10 based on the size of the lens and the location of the lens on the protective gear 12 and the eye location 36 of the user (shown in phantom in FIG. 7) established when the user uses the protective gear and lens. For instance, FIG. 7 shows an exploded view of the lens 10' of FIG. 5. The lens 10' may include one layer and/or material 40 of the coating 30 that provides less than about 5 percent transmittance through the lens for light having wavelengths of less than 400 nm and greater than about 700 nm for the entire horizontal field of view 32 of the lens. The layer and/or material 40 of the coating 30 may provide greater than 75 percent transmittance through the lens of light having a wavelength of between about 400 nm and about 700 nm for the entire horizontal field of view 32 of the lens. The lens 10' may include one layer and/or material 44 of the coating 30 that provides less than about 5 percent transmittance through the lens of light having wavelength between about 530 nm and about 580 nm for a horizontal field of view of the lens of not greater than 60 degrees. The layer and/or material 44 may be applied to entire field of view of the lens but in a manner to provide filtering in generally the near peripheral, paracentral and central viewing zones, for example, +/−30 degrees from center 34 of the lens. The layer and/or material 44 may be applied to central region of the lens (FIG. 8) or as shown in FIG. 7 extend into the mid peripheral zone and into a portion of the far peripheral zone. In areas in the horizontal field of view beyond 60 degrees (i.e., beyond +/−30 degrees from center 34), the coating or layer 44 may also be configured for gradual transmission for light having wavelengths of between about 530 nm and about 580 nm beginning with some transmission in excess of 5 percent in the mid peripheral zone and gradually more transmission in the far peripheral zone sufficient to provide the user with warning in the far peripheral zone. The transmittance characteristics of the lens may be uniform in the vertical field of view of the lens. In this way, the lens coating is configured to ensure that the user of the lens and protective gear is not blinded by light having a wavelength of 555 nm in the line of sight but is alerted when the light having a wavelength of 555 nm is sensed in the user's mid peripheral or far peripheral vision. This warns the user of the lens about potential dangers, especially in the user's mid peripheral or far peripheral vision, without blinding the user directly in the line of sight. The lens also blocks harmful infrared and UV radiation.

Figure 9:
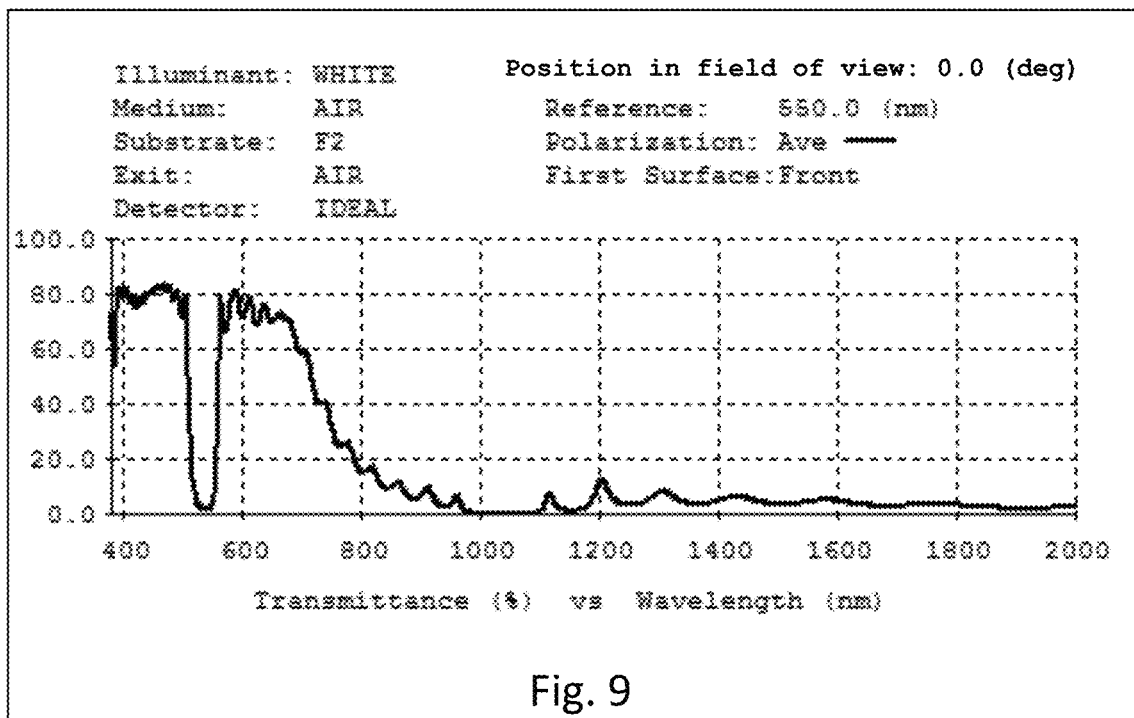
FIGS. 9 and 10 are graphs showing the transmittance characteristics of a coating applied to the lens.
Figure 10:
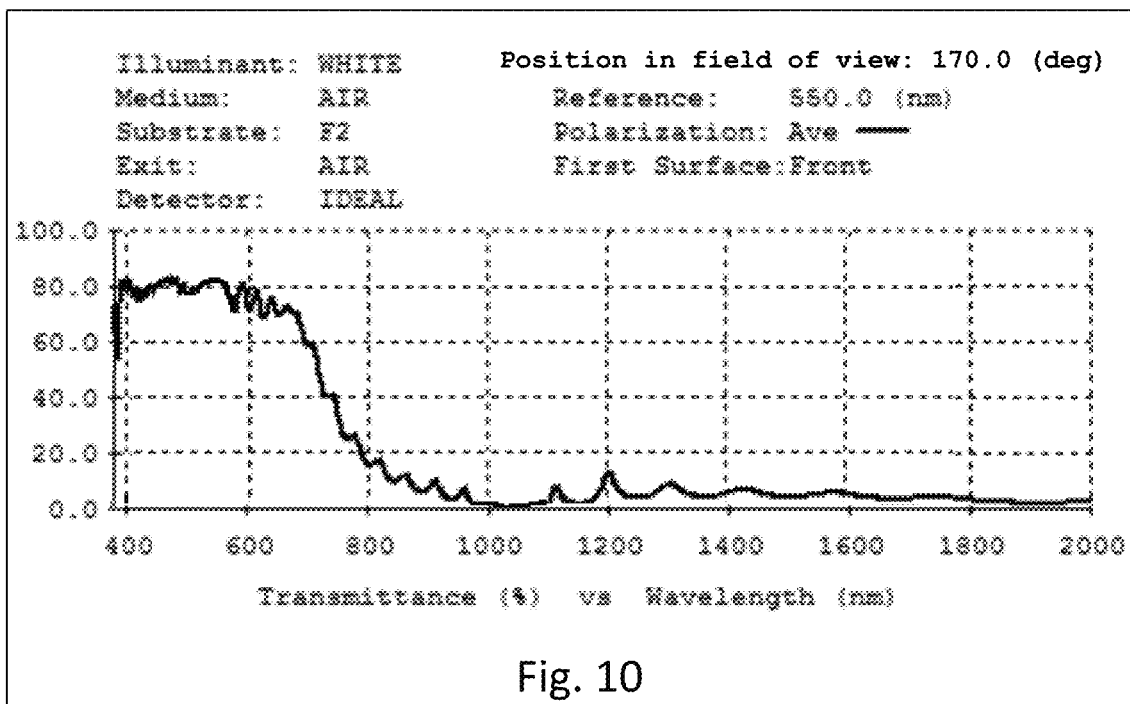

FIG. 9 provides an illustration of the transmittance characteristics of the coating 30 of the lens at a viewing direction of 0 degrees in the horizontal field of view, and FIG. 10 provides an illustration of the transmittance characteristics of the coating 30 of the lens at viewing direction of 170 degrees in the horizontal field of view (i.e., +/−85 degrees from center 34 or the far peripheral vision). In one embodiment, the coating may comprise a dielectric mirror configured as a notch filter to block light having a wavelength of between about 535 nm to about 575 nm.

While FIGS. 3-6 show the coating 30 applied at the interface of the polymer layer 14 and the glass layer 16, the coating may be applied to the polymer layer rather than the glass layer or to the glass layer first surface. In one embodiment, the coating 30 may be deposited on the second surface 24 of the glass layer 16 to protect the coating and to shield any adhesive 26 and the polymer layer 14 from heating through radiation. In addition to or in the alternative, the lens 10, the polymer layer 14, and/or the glass layer 16 may have a transparent conductive coating such as, but not limited to, an indium tin oxide coating (not shown) to assist in blocking infrared radiation and protect the adhesive 26 (if used) and the polymer layer 14 from excessive or transient heating. The glass layer 16 may also comprising a didymium filter to assist in reducing IR and UV radiation and brightness caused by light around the 555 nm wavelength.

Figures 11, 12:
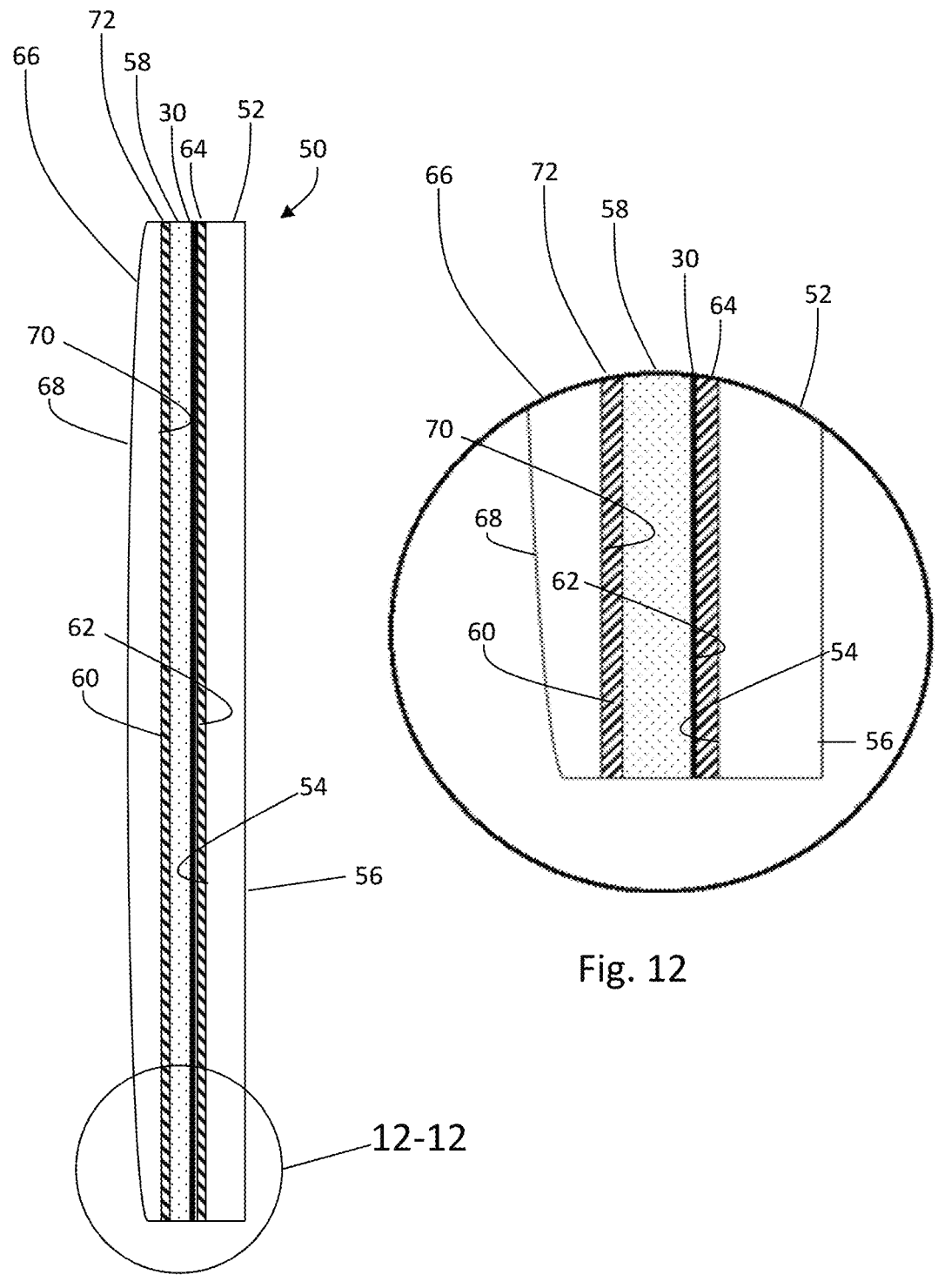
FIG. 11 shows a top, cross sectional view of an alternate embodiment of the lens comprising inner and outer polymer layers secured to a glass layer with adhesive.
FIG. 12 shows an enlarged view of detail area 12-12 of FIG. 11.

FIGS. 11 and 12 provide detail of an alternate embodiment of the lens 50 which in some respects is similar to that described previously in connection with FIGS. 3 and 4. The lens 50 comprises a laminate structure with an inner polymer layer 52 having first and second surfaces 54, 56 and a glass layer 58 having first and second surfaces 60, 62. The glass layer second surface 62 is adjacent to the polymer layer first surface 54 with the polymer layer second surface 56 being exposed from the lens and forming the interior facing structure of the lens that may be placed adjacent to the user of the protective gear. In FIGS. 11 and 12, the inner polymer layer 52 is bonded to the glass layer 58 with an adhesive 64, for instance, a high-temperature silicone laminating adhesive. An outer polymer layer 66 with first and second surfaces 68, 70 may be applied to the first surface 60 of the glass layer 58. The outer polymer layer second surface 70 may be adhered to the first surface 60 of the glass layer 58 with an adhesive 72, for instance, a high-temperature silicone laminating adhesive. The outer polymer layer first surface 68 may form the exterior facing surface of the lens 50. The outer polymer layer 66 may protect the glass layer, for instance, to improve impact resistance and to withstand penetration, while the glass layer acts to stiffen the lens, acts as a flame and thermal barrier, and prevents distortion or sagging of the lens in the event of exposure to prolonged heating.

Depending upon the application, the coating 30 may be applied to glass layer second surface 62, as described above with respect to the embodiment of FIGS. 3-4. The coating 30 may be applied to the glass layer second surface 62, as described previously, for instance, to protect the coating and to shield the adhesive 66 and the inner polymer layer 52 from heating through radiation. In addition to or in the alternative, the coating 30 may also be applied to other layers, for instance, to the glass layer first surface 68, the outer polymer layer first surface 68, and/or the outer polymer layer second surface 70. In addition, the lens 50 may also include a transparent conductive coating such, as but not limited to indium tin oxide coating.

Figures 13, 14:
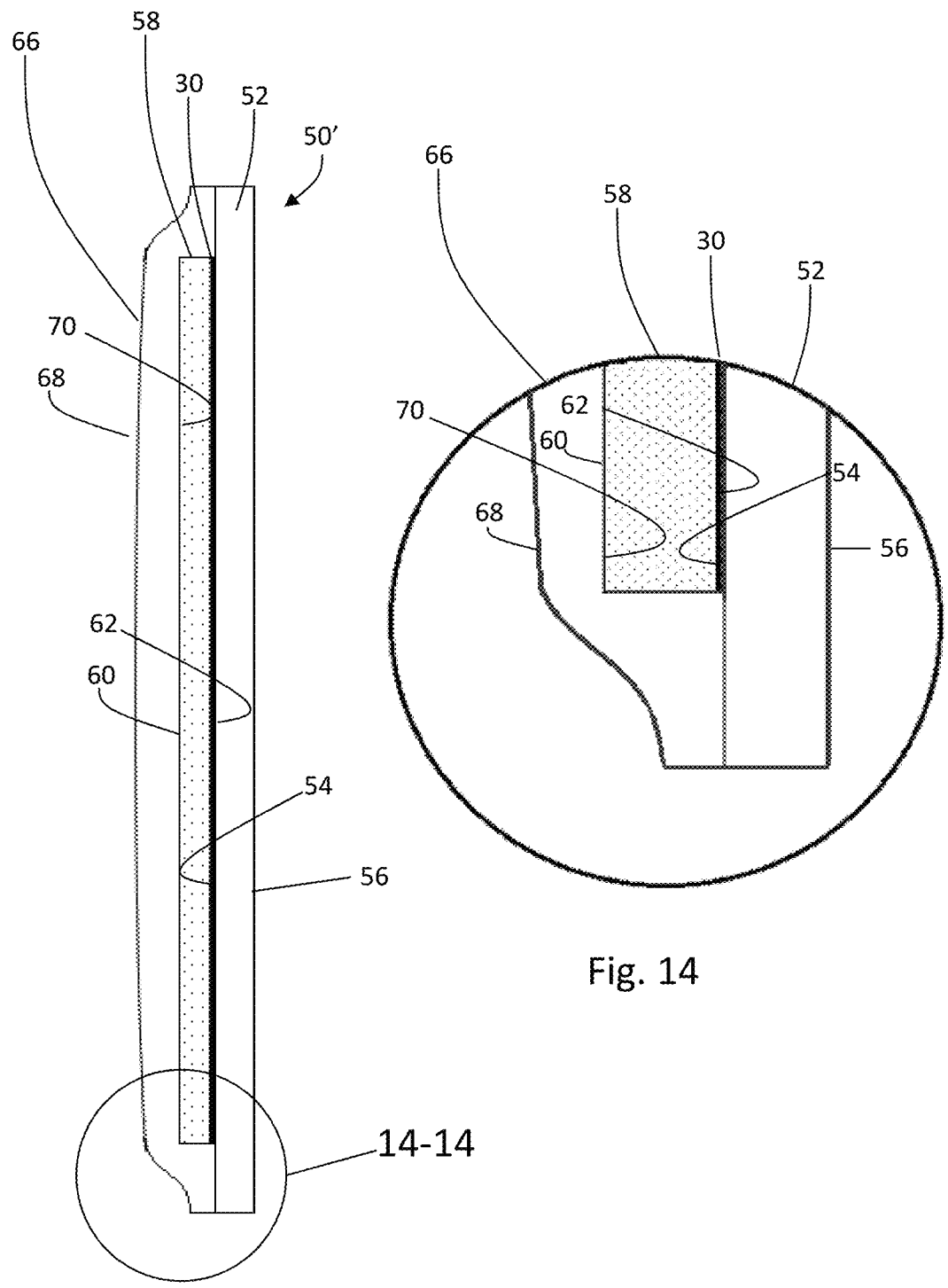
FIG. 13 shows a top, cross sectional view of an alternate embodiment of the lens comprising inner and outer polymer layers secured around the glass layer.
FIG. 14 shows an enlarged view of detail area 14-14 of FIG. 13.

FIGS. 13 and 14 provide detail of an alternate embodiment of the lens 50' which in some respects is similar to that described previously in connection with FIGS. 11 and 12. In FIGS. 13 and 14, the glass layer 58 is sandwiched between the inner and outer polymers 52, 66 such that the polymer layers seal around the glass, The polymer layers may be fused to the glass layer in such a way so as to place the glass layer in compression thereby providing additional strength for the lens 50'. Placing the glass layer in compression between the polymer layers increases the strength of the overall laminate structure of the lens. The glass layer 58 may be completely sealed from the external environment therefore reducing its susceptibility to damage from impact and direct contact. The polymer layers 52, 66 may surround all edges of the glass layer thereby placing the glass in compression in three dimensional axes. A coating 30 as described previously may be applied to glass layer adjacent to the inner polymer layer 52 or the outer polymer layer 66.

Figure 16:
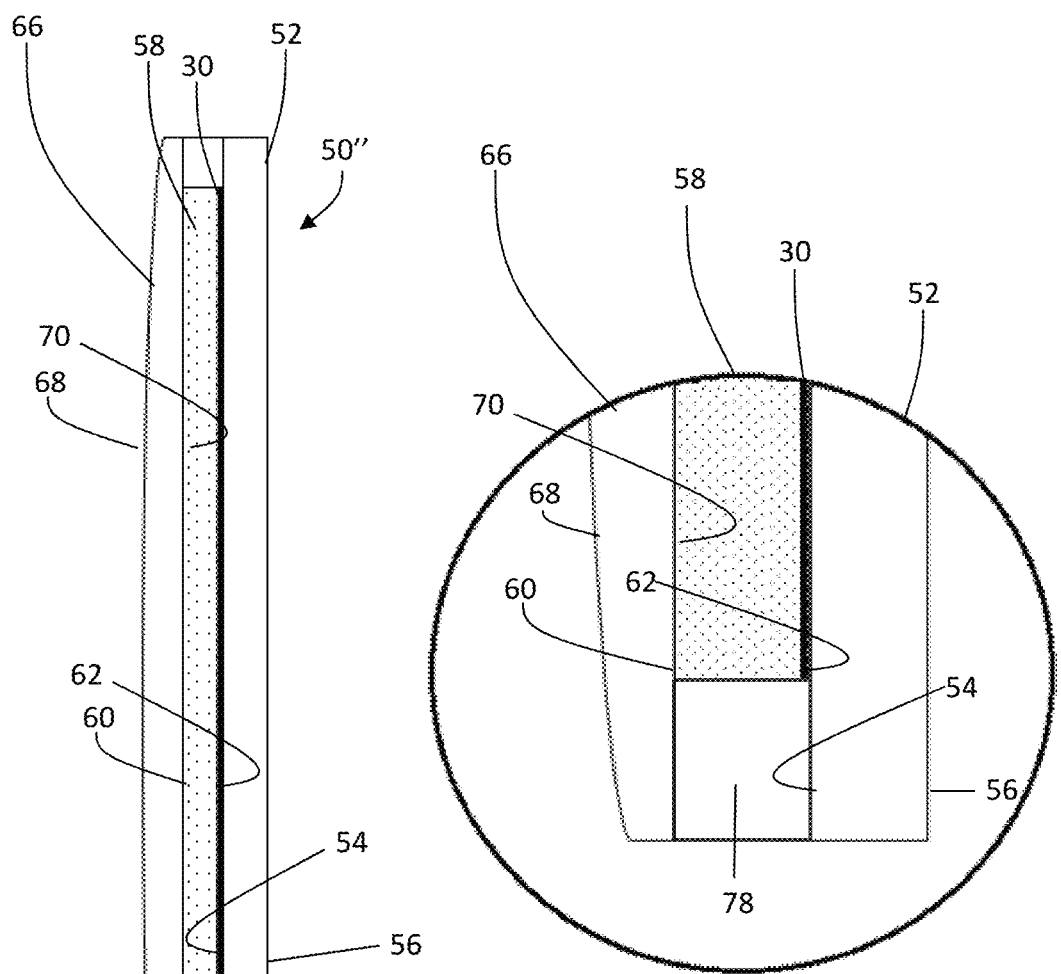
FIG. 16 shows an enlarged view of detail area 16-16 of FIG. 15.
Figure 15:
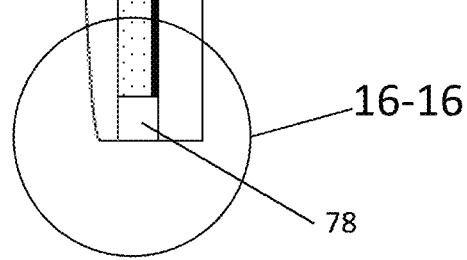
FIG. 15 shows a top, cross sectional view of an alternate embodiment of the lens comprising inner and outer polymer layers secured around the glass layer.

FIGS. 15 and 16 show an alternate embodiment of a construction for a lens 50" where the glass layer 58 is sandwiched between inner and outer polymer layers 52, 66. In the embodiment of FIGS. 15 and 16, a spacer 78 is interposed between the inner and outer layers 52, 66 around the edges of the glass layer 58. The spacer 78 may be formed from material that will fuse with the polymer layers 52, 66. The material for the spacers 78 may be more resistant to softening then the polymer layers 52, 66. Thus, the spacers may provide additional protection for the laminate structure by preventing delamination of the lens at the edges of the lens through heat or impact. Once heated, the spacers and polymer layers may fuse to the glass layer, whereupon cooling of the laminate structure, the glass layer may be placed in compression in multiple axes. With the glass layer 58 sealed from the external environment, especially at its edges vis-a-vis the spacers, its susceptibility to damage from impact and direct contact may be reduced. A coating 30 as described previously may be applied to glass layer adjacent to the inner polymer layer 52.

Figure 17:
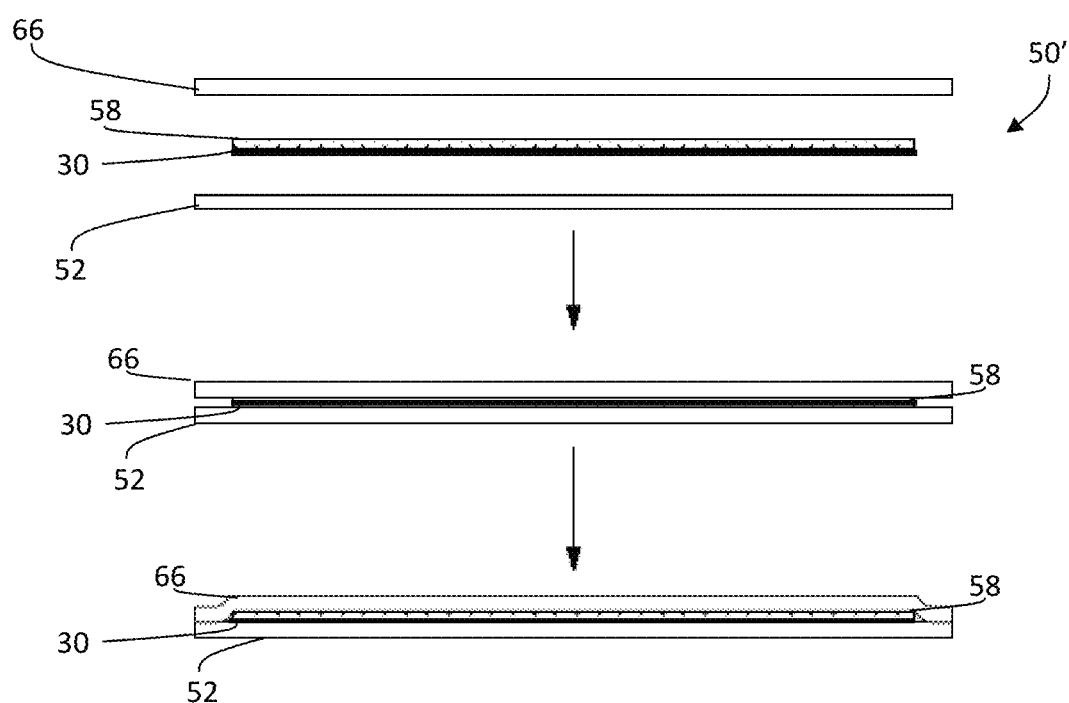
FIG. 17 shows a process flow for forming one embodiment of a laminate structure that may be used for the lens of FIGS. 13-14.

FIG. 17 shows a schematic process flow for forming a lens as shown in FIGS. 13 and 14. As described previously, the glass layer is sandwiched between polymer layers. The inner and outer polymer layers 52, 66 may have peripheral edges that are greater in dimension that peripheral edges of the glass layer 58. The inner and outer polymer layers may be arranged relative to the glass layers such that their respective peripheral edges surround the glass layer peripheral edges. The laminate assembly may then be heated to below the softening of the polymer layers forming a laminate comprising the polymer layers with the glass layer disposed therebetween. The heating of the inner and outer polymer layers and the glass layer fuses the polymer layers to the glass layer. The heating may take place in a vacuum environment and may include degassing so as to remove any gasses entrapped between the polymer and the glass layers. After degassing, heating of the laminate may continue at a temperature corresponding to the softening point of the polymer. As shown in FIG. 17, because the inner and outer polymer layers 52, 66 have peripheral edges that are greater in dimension that peripheral edges of the glass layer 58, the outer layer of polymer will sag downward toward the inner layer 52 of polymer, thereby fully encapsulating the glass layer 58 in the polymer. Once the inner layer is edge sealed to the outer layer, the vacuum can be released, exposing the assembly to atmospheric pressure, eliminating any bubbles, and insuring optimal sealing of the polymer layers to the glass. Further, because the inner and outer polymer layers 52, 66 have peripheral edges that are greater in dimension that peripheral edges of the glass layer, as the outer layer sags toward the inner layer, the dimensional thickness of lens as measured between the inner and outer polymer layers is less at a peripheral edge of the lens than at a center of the lens where the glass layer is disposed between the polymer layers. A weighted tool can also be used along the edge to assist in the fusing of the inner and outer layer edges. Because the coefficient of thermal expansion of the polymer layers is considerably higher than the coefficient of thermal expansion of the glass layer, the glass layer is compressed by the polymer layers when the laminate cools. Once the laminate is cooled, the glass layer encapsulated in the polymer layers will be under compression thereby increasing the strength of the overall laminate and reducing the potential for the glass layer to be damaged from impact by direct contact. A coating 30 as described previously may be applied to glass layer 58 adjacent to the inner polymer layer 52 or the outer polymer layer 66. The process may also be performed in a manner where the inner polymer layer sags toward the outer polymer layer.

Figure 18:
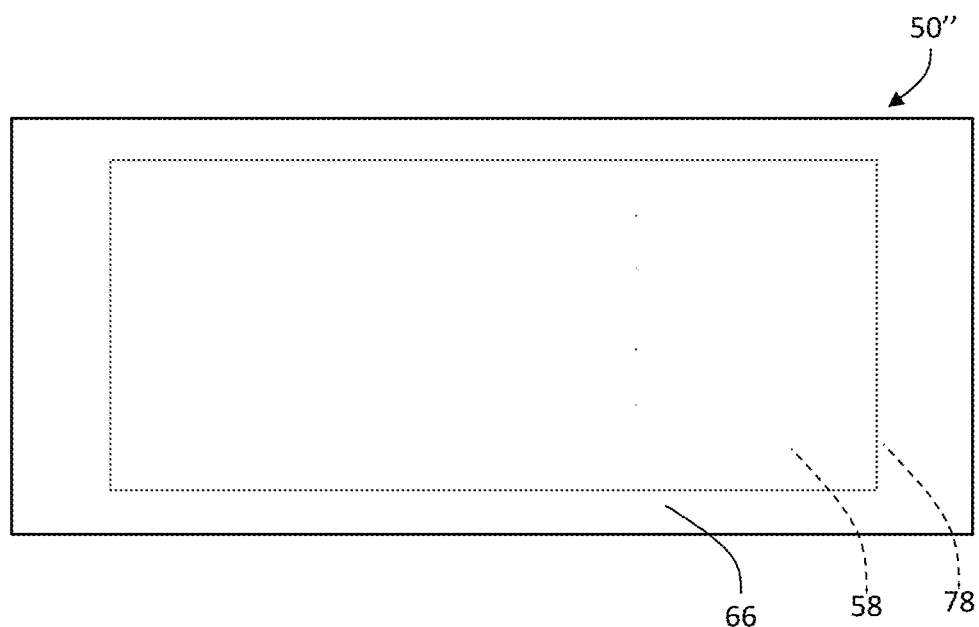
FIG. 18 shows a front schematic view of the lens of FIGS. 15-16.

FIG. 18 is a schematic of a front view of a lens having the construction of type shown in FIGS. 15 and 16. The glass layer may be sandwiched between the inner and outer layers and the spacer may be disposed around the edges of the glass layer between the inner and outer polymer layers. The spacer 78 may comprise a frame within which the glass layer 58 is disposed. A heating method similar to that described previously with reference to FIG. 17 may be employed, but in an embodiment including the spacer 78, the outer polymer layer 66 will not sag towards the inner polymer layer 52, but the layers will bond to the spacer. Thus, in the embodiment of the lens shown for example in FIGS. 15-16, the dimensional thickness of lens as measured between the inner and outer polymer layers is same at the peripheral edge of the lens as at the center of the lens. Once the laminate is cooled, the glass layer 58 may be sealed in the polymer layers 52, 66, 78 and held in compression, including radially inward toward the center of the lens, thereby increasing the strength of the lens.

Figure 19:
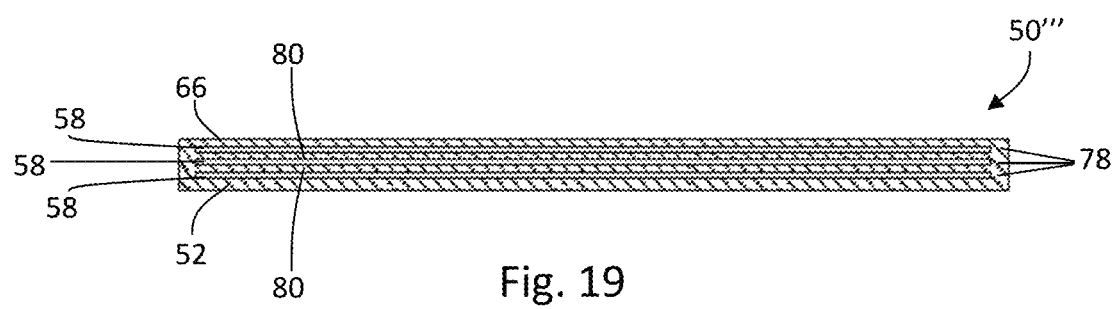
FIG. 19 shows an top, cross-sectional view of alternate embodiment of a lens.

FIG. 19 shows another embodiment of a lens 50''' having a construction similar to the lens of FIGS. 15 and 16 but with multiple glass layers 58. As shown in FIG. 19, the laminate lens structure includes three glass layers 58 interposed between inner and outer polymer layers 52, 66, and two intermediate polymer layers 80. Spacers 78 surround the outer edges of the glass layers 58. One or more of the spacers may comprise frames within which the respective glass layer is disposed. Because the edges of the glass layers 58 are encapsulated within the polymer layers 52, 66, 80 and the spacers 78, the there is no slip between the glass layers and the polymer layers and the glass layers 58 are placed in compression thereby improving strength of the overall laminate construction. Although the embodiment of FIG. 19 shows the spacers 78 disposed between the inner and outer polymer layers and the intermediate polymer layer, the spacers may be omitted and the outer polymer layer and intermediate polymer layers may sag toward the inner polymer layer during heating to encapsulate the glass layers, for instance, as shown with respect to FIGS. 13, 14, and 17.

Figure 20:
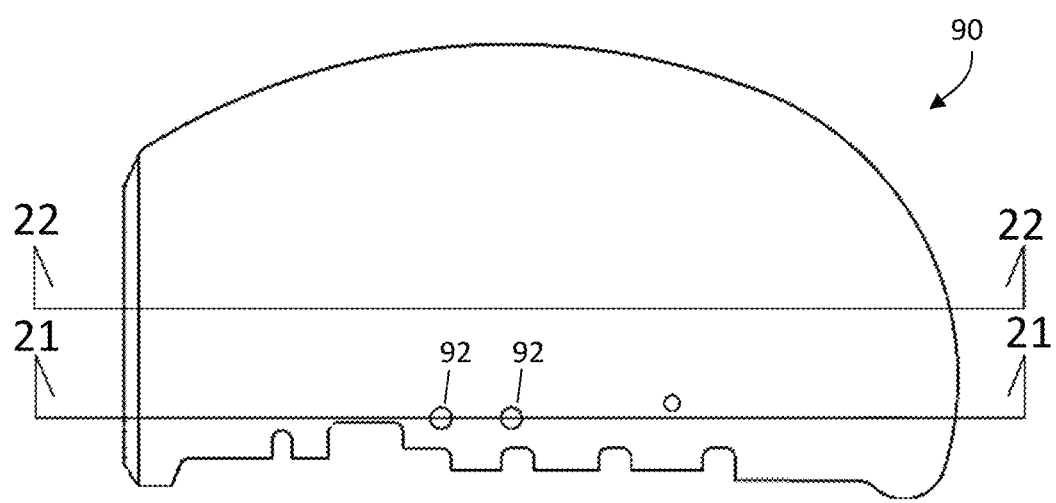
FIG. 20 shows a front view of an alternative embodiment of a lens.
Figure 21:
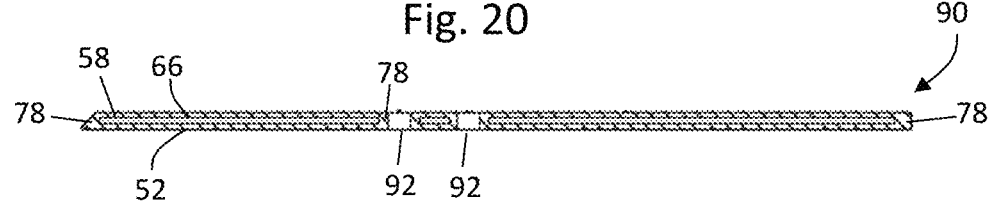
FIG. 21 shows a top, cross section view of the lens taken along lines 20-20 of FIG. 19.
Figure 22:
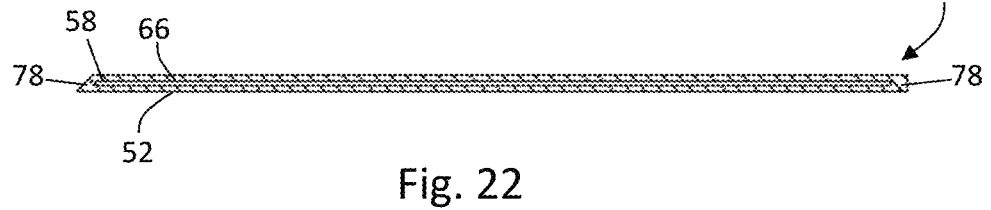
FIG. 22 shows a top, cross section view of the lens taken along lines 21-21 of FIG. 19.

FIGS. 20-22 show another embodiment of a lens 90 comprising a "flip-up" style fire shield. The lens has a construction similar to that described earlier and may include a coating (not shown) which provides a desired transmission of light in selected wavelengths as described previously. The glass layer 58 (e.g., a borosilicate) may be embedded in impact resistant polymer layers 52, 66 (e.g., polycarbonate). Spacers 78 may be provided so that the edges of the glass layer 58 are completely encapsulated and the glass layer is not exposed and is fused to the polymer layers as described previously. As shown in FIG. 21, areas around screw holes 92, which secure the lens to a protective helmet, may include the spacers 78. Thus, the polymer layer may surround the glass layer so as to fully encapsulate the glass layer in areas around the screw holes 92.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lens for protective gear comprising:
 a first polymer layer and a second polymer layer,
  wherein said first polymer layer comprises first polymer layer peripheral edges and said second polymer layer comprises second polymer layer peripheral edges;
 a glass layer between the first polymer layer and said second polymer layer,
  the glass layer comprising peripheral edges,
  the glass layer being encapsulated by a combination of the first polymer layer and said second polymer layer including said peripheral edges of said glass layer,
   such that said first polymer layer peripheral edges extend beyond said peripheral edges of the glass layer, and
   such that said second polymer layer peripheral edges extend beyond said peripheral edges of the glass layer, and the glass layer being in compression from said first polymer layer and said second polymer layer in multiple axes;
 a coating comprising a material that provides:
  less than about 5 percent transmittance through the lens for light having a wavelength greater than about 700 nm for an entire horizontal field of view of the lens, wherein the entire horizontal field of view of the lens comprises an angle spanning across the lens entirely;
  less than about 5 percent transmittance through the lens for light having wavelength between about 530 nm and about 580 nm for a central horizontal field of view of the lens of not greater than 60 degrees, wherein the central horizontal field of view of the lens comprises an angle spanning across a center of the lens; and
  greater than about 75 percent transmittance through the lens for light having wavelengths of between about 400 nm and about 530 nm and between about 580 nm and about 700 nm for the entire horizontal field of view of the lens;
 wherein the glass layer comprises a material that maintains its structural integrity up to at least about 500 degrees Celsius; and,
 wherein said lens is configured to couple with said protective gear configured to be worn by a user.

2. The lens of claim 1, wherein the first polymer layer forms an outer surface of the lens.

3. The lens of claim 1, wherein said protective gear comprises a helmet, wherein the helmet comprises a face shield and wherein the lens is configured to be incorporated into the face shield of the helmet.

4. The lens of claim 1, wherein the lens comprises uniform transmittance characteristics in a vertical field of view of the lens.

5. The lens of claim 1, wherein the coating is disposed between the glass layer and the second polymer layer.

6. A lens for protective gear comprising:
 a first polymer layer comprising a first surface, a second surface and peripheral edges;
 a glass layer comprising a first surface, a second surface and peripheral edges;
 a second polymer layer adjacent to the first surface of the glass layer, wherein the second polymer layer comprises peripheral edges,
  wherein the glass layer is encapsulated by a combination of the first polymer layer and the second polymer layer on said peripheral edges of said glass layer,
   such that said peripheral edges of said first polymer layer extend beyond said peripheral edges of said glass layer, and
   such that said peripheral edges of said second polymer layer extend beyond said peripheral edges of said glass layer, and
  wherein the glass layer is in compression from said first polymer layer and said second polymer layer in multiple axes;
 a coating comprising a material that provides:
  less than about 5 percent transmittance through the lens for light having a wavelength greater than about 700 nm for an entire horizontal field of view of the lens, wherein the entire horizontal field of view of the lens comprises an angle spanning across the lens entirely;
  less than about 5 percent transmittance through the lens for light having wavelength between about 530 nm and about 580 nm for a central horizontal field of view of the lens of not greater than 60 degrees, wherein the central horizontal field of view of the lens comprises an angle spanning across a center of the lens;
  greater than about 75 percent transmittance through the lens for light having wavelengths of between about 400 nm and about 530 nm and between about 580 nm and about 700 nm for the entire horizontal field of view of the lens;
 wherein the glass layer comprises a material that maintains its structural integrity up to at least about 500 degrees Celsius;
 wherein a dimensional thickness of the lens as measured between the first polymer layer and the second polymer layer is less at a peripheral edge of the lens compared to a center of the lens; and,
 wherein said lens is configured to couple with said protective gear configured to be worn by a user.

7. The lens of claim 6, wherein the first polymer layer is molded directly onto the glass layer.

8. The lens of claim 6, wherein the lens comprises uniform transmittance characteristics in a vertical field of view of the lens.

9. The lens of claim 6, wherein the coating is applied to the second surface of the glass layer.

10. A lens for protective gear comprising:
 a first polymer layer comprising a first surface, a second surface and peripheral edges,
  wherein said peripheral edges of said first polymer layer extend between said first surface of said first polymer layer and said second surface of said first polymer layer;

a glass layer comprising a first surface, a second surface and peripheral edges,
 the second surface of said glass layer being adjacent to the first surface of the first polymer layer with the second surface of the first polymer layer being exposed from the lens, and
a second polymer layer comprising a first surface, a second surface and peripheral edges,
 wherein said peripheral edges of said second polymer layer extend between said first surface of said second polymer layer and said second surface of said second polymer layer, and
wherein the glass layer is encapsulated by a combination of the first polymer layer and the second polymer layer on said peripheral edges of said glass layer,
 wherein that said second surface of the first polymer layer is adjacent to the glass layer such that the peripheral edges of said first polymer layer extend beyond said peripheral edges of the glass layer,
 wherein the first surface of the second polymer layer is exposed from the lens and the second surface of the second polymer layer is adjacent to the first surface of the glass layer, such that the peripheral edges of the second polymer layer extend beyond said peripheral edges of the glass layer, and
 wherein the glass layer is in compression from said first polymer layer and said second polymer layer in multiple axes;
a coating comprising a material that provides:
 less than about 5 percent transmittance through the lens for light having wavelengths of greater than about 700 nm for an entire horizontal field of view of the lens,
  wherein the entire horizontal field of view of the lens comprises an angle spanning across the lens,
 greater than about 75 percent transmittance through the lens for light having wavelengths of between about 400 nm and about 530 nm and between about 580 nm and about 700 nm for the entire horizontal field of view of the lens with less than about 5 percent transmittance through the lens for light having wavelength between about 530 nm and about 580 nm for a central horizontal field of view of the lens of not greater than 60 degrees,
  wherein the central horizontal field of view of the lens comprises an angle spanning across a center of the lens;
wherein the glass layer comprises a material that maintains its structural integrity up to at least about 500 degrees Celsius;
wherein said lens is configured to couple with said protective gear configured to be worn by a user; and,
wherein the lens comprises uniform transmittance characteristics in a vertical field of view of the lens.

11. The lens of claim 10, wherein the coating is disposed between the glass layer and the first polymer layer.

* * * * *